United States Patent [19]

Kasai et al.

[11] Patent Number: 4,776,959
[45] Date of Patent: Oct. 11, 1988

[54] HYDROPHILIC POROUS MEMBRANE AND METHOD FOR MANUFACTURING THEREOF

[75] Inventors: Masaaki Kasai; Noriyuki Koyama, both of Fujinomiya, Japan

[73] Assignee: Terumo Corporation, Tokyo, Japan

[21] Appl. No.: 37,240

[22] Filed: Apr. 13, 1987

Related U.S. Application Data

[63] Continuation of Ser. No. 815,643, Jan. 2, 1986, abandoned.

[30] Foreign Application Priority Data

Jan. 10, 1985 [JP] Japan .................................. 60-1420

[51] Int. Cl.$^4$ .............................................. B01C 13/00
[52] U.S. Cl. .................................. 210/490; 210/500.42
[58] Field of Search ................... 210/490, 500.42, 644; 427/58, 245; 55/16, 158

[56] References Cited

U.S. PATENT DOCUMENTS

| | | | |
|---|---|---|---|
| 4,419,187 | 12/1983 | Cheng et al. | 55/158 X |
| 4,432,875 | 2/1984 | Wrasidlo et al. | 210/500.42 X |
| 4,438,185 | 3/1984 | Taskier | 427/58 X |

*Primary Examiner*—Frank Spear
*Attorney, Agent, or Firm*—Cushman, Darby & Cushman

[57] ABSTRACT

A hydrophilic porous membrane comprises a porous membrane made of a hydrophobic polymer and a coating formed on at least one surface of the porous membrane and on the inner surface of pores of the membrane with a water-insoluble hydrophilic polymer soluble in a solvent exhibiting satisfactory stability and a satisfactory wetting property with respect to the hydrophobic polymer and a method for the manufacture of the hydrophilic porous membrane.

15 Claims, 1 Drawing Sheet

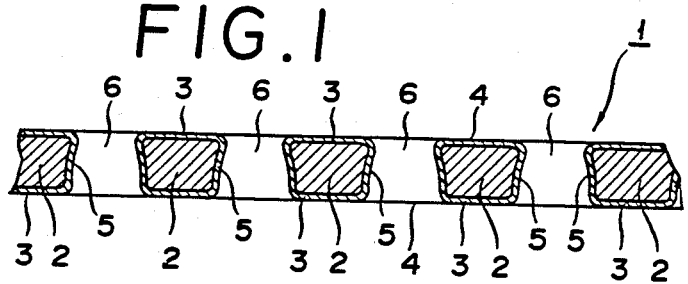
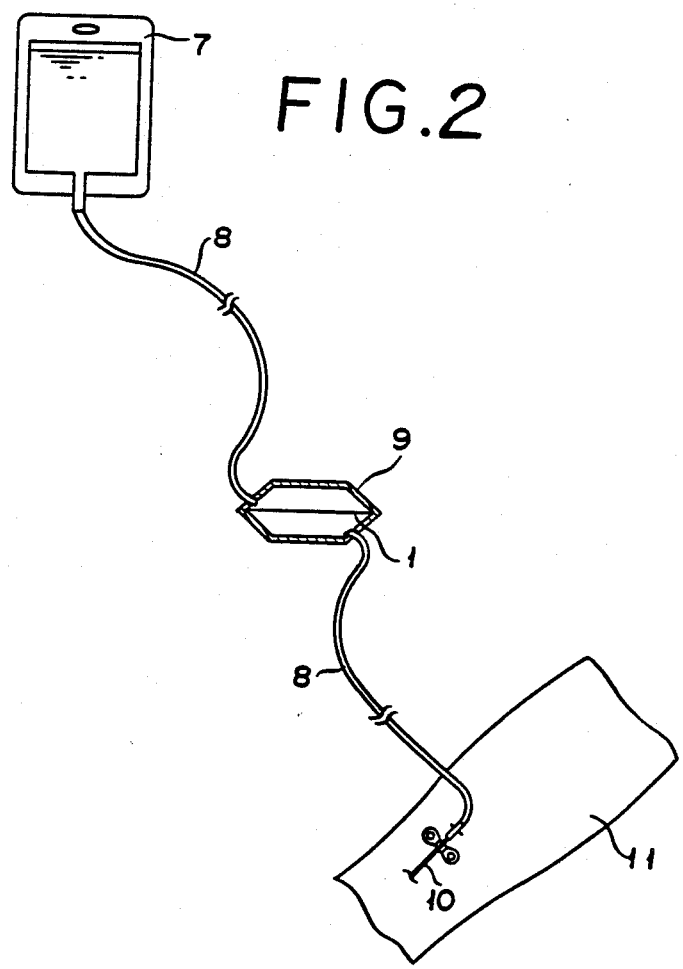

HYDROPHILIC POROUS MEMBRANE AND METHOD FOR MANUFACTURING THEREOF

This is a continuation of application Ser. No. 815,643, filed Jan. 2, 1986, now abandoned.

BACKGROUND OF THE INVENTION

1. Field of the Invention

This invention relates to a hydrophilic porous membrane and a method for the manufacture of the membrane, and more particularly relates to a hydrophilic porous membrane obtained by the impartation of hydrophilicity to the surface of a hydrophobic porous membrane and excelling in perviousness to water and mechanical strength.

2. Description of Prior Art

Heretofore, cellulose derivatives possessing high perviousness to water, particularly porous membranes of cellulose acetate, have prevailed as high molecular porous membranes for use in various applications to filtration and dialysis, for example. Unfortunately, these cellulose derivatives find utility in a greatly limited range of applications because they are deficient in resistance to acids, alkalis, and organic solvents and are easily deformed by heat and pressure.

To take the place of these porous membranes of cellulose derivatives, porous membranes made of non-cellulose type synthetic resins. They are widely varied in type, embracing cross-linked water-soluble high molecular compounds, copolymers of hydrophilic monomers and hydrophobic monomers, homogeneous polymers from polar monomers, hydrophobic polymers caused to incorporate therein a hydrophilic group, and aromatic and heterocyclic condensates.

Among other porous membranes of such non-cellulose type synthetic resins, those of hydrophobic porous membrane incorporating therein a hydrophilic group have the advantage that generally the membranes themselves excel in various properties such as strength and resistance to chemicals. So long as the impartation of hydrophilicity is safely attained as expected, therefore, these hydrophobic polymers are allowed to produce porous membranes which enjoy excellent balance between perviousness to water and imperviousness to substances subjected to removal and possess high strength.

As means of imparting hydrophilicity to hydrophobic porous membranes, the method which effects impartation of a hydrophilic group to the surface of a membrane by teating the membrane with an aqueous solution of such alkali hydroxide as sodium hydroxide or potassium hydroxide (Japanese Patent Laid-Open SHO 58(1983)-93,734) has been known in the art. This method has the problem that the conditions for the effective use of the membrane are not easily managed because the membrane possibly loses strength because of the action of the alkali. The method which effects the impartation of hydrophilicity by graft polymerizing a hydrophilic monomer to the surface of a hydrophobic polymer (Japanese Patent Publication SHO 56(1981)-44,098) has also been known in the art. This method has a fair possibility that since the hydrophobic polymer is a porous substance, the graft polymerization does not easily proceed uniformly even in the pores. The method which effects the impartation of hydrophilicity by immersing a hydrophobic porous membrane in an alcohol, then treating the membrane with an aqueous solution of a water-soluble polymer, drying the treated membrane, and thereafter insolubilizing the water-soluble polymer deposited on the membrane by a treatment with heat or radiation (Japanese Patent Laid-Open SHO 54(1979)-17,978) has been known also in the art. This method has the disadvantage that much time is spent between the time the membrane is immersed in the alcohol and the time the alcohol in the membrane is substituted with the aqueous polymer solution and the heat or radiation used during the treatment for insolubilization has a fair possibility of degrading the strength of membrane and varying the diameter of pores in the membrane. In the existing circumstance, therefore, a porous membrane which enjoys excellent balance between perviousness to water and imperviousness to substances subjected to removal and possesses high strength cannot be obtained by imparting a hydrophilic group to a hydrophobic porous membrane.

An object of this invention, therefore, is to provide a novel hydrophilic porous membrane and a method for the manufacture of the membrane.

Another object of this invention is to provide a hydrophilic porous membrane which is obtained by imparting hydrophilicity uniformly to the surface of a hydrophobic porous membrane and which excels in perviousness of water and mechanical strength and a method for the manufacture of the membrane.

Still another object of this invention is to provide an inexpensive hydrophilic porous membrane which has undergone easy and quick impartation of hydrophilicity at no sacrifice of the strength inherent in the substrate of membrane and a method for the manufacture of the membrane.

SUMMARY OF THE INVENTION

The objects described above are accomplished by a hydrophilic porous membrane which comprises a porous membrane of a hydrophobic polymer and a coating formed on at least one surface of the porous membrane and on the inner surface of the pores of the porous membrane with a water-soluble hydrophilic polymer soluble in a solvent exhibiting satisfactory stability and a satisfactory wetting property with respect to the hydrophobic polymer mentioned above. This invention is also directed to a hydrophilic porous membrane wherein the water-insoluble hydrophilic polymer is vinyl alcohol-vinyl acetate copolymer, vinyl acetate-vinyl pyrrolidone copolymer, polymethyl methacrylate-polyethylene glycol block copolymer, or a segmented polyurethane having polyethylene glycol as a soft segment thereof. This invention is further directed to a hydrophilic porous membrane wherein the hydrophobic polymer is a fluorine resin type polymer or a polyolefin type polymer, preferably polyvinylidene fluoride.

The various objects described above are also accomplished by a method for the manufacture of a hydrophilic porous membrane, which is characterized by preparing a porous membrane of a hydrophobic polymer, impregnating the porous membrane with a solution obtained by dissolving a water-insoluble hydrophilic polymer in a solvent showing a satisfactory ability to dissolve the hydrophilic polymer and exhibiting satisfactory stability and wetting ability with respect to the hydrophobic polymer, and thereafter drying the impregnated porous membrane.

This invention is also directed to a method for the manufacture of a hydrophilic porous membrane wherein the water-insoluble hydrophilic polymer is vinyl alcohol-vinyl acetate copolymer, vinyl acetate-vinyl pyrrolidone copolymer, polymethyl methacrylate-polyethylene glycol block copolymer, or a segmented polyurethane having polyethylene glycol as a soft segment thereof.

This invention is further directed to a method for the manufacture of a hydrophilic porous membrane, wherein the solvent is one member selected from the group consisting of methanol, ethanol, isopropanol, and mixtures of the alcohols with water. This invention is directed also to a method for the manufacture of a hydrophilic porous membrane, wherein the polymer concentration in the solution falls in the range of from 0.1 to 10.0% by weight. This invention is directed further to a method for the manufacture of a hydrophilic porous membrane, wherein the hydrophobic polymer is a fluorine resin type polymer or a polyolefin type polymer, preferably polyvinylidene fluoride. Further this invention is directed to a method for the manufacture of a hydrophilic porous membrane, wherein the impregnation of the porous membrane of the hydrophobic polymer with the solution of the water-insoluble hydrophilic polymer is effected by the immersion of the porous membrane in the solution preferably for a period of 1 to 30 seconds.

BRIEF DESCRIPTION OF THE DRAWINGS

FIG. 1 is a magnified cross section illustrating as a model a hydrophilic porous membrane of this invention, and FIG. 2 is a diagram illustrating the manner in which a final filter for transfusion incorporating therein a typical hydrophilic porous membrane of this invention.

EXPLANATION OF THE PREFERRED EMBODIMENT

Now, this invention will be described more specifically below.

The porous membrane made of a hydrophobic polymer and used in the method of this invention for the manufacture of a hydrophilic porous membrane is only required to possess ample strength. It is nevertheless desired to be made of a material which excels also in other properties such as resistance to heat and resistance to chemicals. Examples of the hydrophobic polymer meeting this description include olefin type polymers such as polyethylene and polypropylene and fluorine resin type polymers such as polyvinylidene fluoride and polytetrafluoroethylene. Among other hydrophobic polymers enumerated above, fluorine resin type polymers, particularly polyvinylidene fluoride, prove especially desirable. The term "polyvinylidene fluoride" embrances copolymers of vinylidene fluorine as a principal monomer with such comonomers as ethylene tetrafluoride, methyl acrylate, and propylene besides homopolymer of vinylidene fluoride. The porous membrane of such a hydrophobic polymer can be prepared by any of the known methods. Wherein the hydrophobic polymer is polyvinylidene fluoride, for example, there may be adopted the wet method which comprises dissolving the resin in a solvent, rolling the resultant solution into a prescribed shape, expelling part of the solvent from the molded solution by vaporization, then immersing the molded solution in a bad solvent miscible with the solvent thereby extracting the solvent from the molded solution, and thereafter completely vaporising the bad solvent and the residual solvent and obtaining a porous membrane or the dry method which comprises mixing the resin from the beginning with a solvent and a bad solvent miscible with the solvent to form a solution, rolling the resultant solution into a desired shape, and completely vaporizing the solvent and the bad solvent thereby forming a porous membrane. Desirably, the porous membrane of polyvinylidene fluoride is obtained, as disclosed in Japanese Patent Laid-open SHO 49(1974)-126,572 and SHO 52(1977)-154,862, by using as a solvent befitting the wet method or dry method a mixture of a quickly drying solvent such as acetone, tetrahydrofuran, methyl ethyl ketone, ethyl acetate, etc. and a slowly drying solvent such as dimethyl formamide, dimethyl acetamide, diethyl acetamide, tetramethyl urea, dimethylsulfoxide, diethyl formamide, tetraethyl urea, etc. different in vapor partial pressure from each other and, during the course of gelling, causing part of the resin to be dissolved or swelled with the slowly drying solvent and furnishing the resin with enhanced mechanical strength. By this method, the porous membrane of the hydrophobic polymer is generally produced with a thickness of 50 to 300 μm, preferably 100 to 200 μm, and an average pore diameter of 0.1 to 1.0 μm, preferably 0.2 to 0.6 μm.

In accordance with the method of this invention, the porous membrane made of such a hydrophobic polymer as described above is impregnated with a solution which is obtained by dissolving a water-insoluble hydrophilic polymer in a solvent exhibiting a satisfactory ability to dissolved the hydrophilic polymer and possessing high stability and a high wetting property with respect to the hydrophobic polymer.

As the water-insoluble hydrophilic polymer exhibiting satisfactory stability and a satisfactory wetting property with respect to the hydrophobic polymer, various examples are conceivable, depending on the kind of the hydrophobic polymer used. When the hydrophobic polymer is polyvinylidene fluoride, for instance, such examples include vinyl alcohol-vinyl acetate copolymers, random and block copolymers of vinyl pyrrolidone such as vinyl acetate-vinyl pyrrolidone copolymer, polyethylene glycol block copolymers such as polymethyl methacrylate-polyethylene glycol block copolymer, segmented polyurethane having polyethylene glycol as a soft segment thereof, and block and random polyamino acids combining hydrophilic amino acids (wherein an organic residue except amino group is hydrophilic) with hydrophobic amino acids (wherein an organic residue except amino group is hydrophobic). Among other water-insoluble hydrophilic polymers enumerated above, vinyl alcohol-vinyl acetate copolymers prove particularly desirable because they exhibit satisfactory affinity for polyvinylidene fluoride. Such a vinyl alcohol-vinyl acetate copolymer is obtained by partial saponification of polyvinyl acetate which is effected by the conventional method. The saponification degree is desired to fall in the range of 15 to 60 mol%, preferably 25 to 45 mol% and the polymerization degree in the range of 10 to 1,000, preferably 30 to 200.

The solvent to be used in the method of this invention must exhibit a satisfactory ability to dissolve the hydrophilic polymer of the type described above and, at the same time, exhibit satisfactory stability and a satisfactory wetting property with respect to the aforementioned hydrophobic polymer. The expression "satisfactory stability" as used herein is intended to mean a condition such that when the porous membrane made of the hydrophobic polymer is impregnated with the solution of the hydrophilic polymer in the solvent mentioned above, the texture, strength, etc. of the porous membrane will not be affected by the solvent, namely that during the course of the treatment of impregnation, the solvent does not substantially manifest a swelling or dissolving action on the hydrophobic polymer. The solvent of this description, therefore, is selected, depending on the kind of the hydrophilic polymer and that of the hydrophobic polymer. Where the hydrophilic polymer is a vinyl alcohol-vinyl acetate copolymer, poly(2-hydroxyethyl methacrylate), a random of block copolymer of vinyl pyrrolidone such as vinyl acetate-vinyl pyrrolidone copolymer, a block copolymer of polyethylene glycol such as polymethyl methacrylate-polyethylene glycol block copolymer, a segmented polyurethane having polyethylene glycol as a soft segment thereof, or a block or random polyamino acid combining a hydrophilic amino acid with a hydrophobic amino acid and the hydrophobic polymer is polyvinylidene fluoride, for example, the solvent to be used can be selected from among lower alcohols such as methanol, ethanol, and isopropanol and mixtures of such alcohols with water.

By this solvent, the hydrophilic polymer is dissolved and consequently transformed into a solution. The concentration of the hydrophilic polymer in the solution is generally in the range of 0.1 to 10.0% by weight, preferably 1 to 3% by weight, although it is variable with the average pore diameter possessed by the porous membrane of the hydrophobic polymer subjected to the treatment of impregnation. If this concentration is less than 0.1% by weight, there arises a possibility that the impartation of uniform hydrophilicity to the hydrophobic polymer will not be attained as expected. If the concentration exceeds 10.0% by weight, there ensures a possibility that the solution will decrease the pore diameter of the porous membrane and degrade the perviousness of the membrane to water. The porous membrane made of the hydrophobic polymer is impregnated with the solution of the hydrophilic polymer prepared as described above by being immersed in this solution for a period of 1 to 30 seconds, preferably 10 to 20 seconds, so that the solution will uniformly adhere fast to the entire surface of the porous membrane including the surface in the pores.

The porous membrane of the hydrophobic polymer which has undergone the impregnation with the solution of the hydrophilic polymer is then dried thoroughly in an oven kept at 60° to 80° C., for example, to expel the solvent and give rise to a hydrophilic porous membrane which comprises the porous membrane of hydrophobic polymer and a coating of the hydrophilic polymer uniformly deposited on the entire surface of the membrane and on the inner surface of the pores of the membrane. The amount of the hydrophilic polymer to be used falls in the range of 0.01 to 10 parts by weight, preferably 0.05 to 1 parts by weight per 100 parts by weight of the hydrophobic polymer.

The hydrophilic porous membrane 1 obtained as described above is characterized by having on at least one surface of the porous membrane made of the hydrophobic polymer 2 and on the inner surface of the pores of the membrane a coating of the water-insoluble hydrophilic polymer 3 which is soluble in a solvent exhibiting satisfactory stability and a satisfactory wetting property with respect to the hydrophobic polymer. As illustrated in FIG. 1, the hydrophilic polymer 3 is deposited fast on the surface 4 of the porous membrane and on the inner surface 5 of the pores so as to impart hydrophilicity to the porous membrane. The diameter inherently possessed by the pores 6 of the membrane of the hydrophobic polymer 2 is not decreased so much by the deposition of the hydrophilic polymer 3 as to deprive the membrane substantially of its quality. Since the adhesion of the hydrophilic polymer 2 to the hydrophobic polymer 1 relies on the affinity of the one for the other of the two polymers. The combination of polyvinylidene fluoride with a vinyl alcohol-vinyl acetate copolymer, for example, is desired to be such that this adhesion will be attained with ample fastness.

The preceding description has been made on the assumption that the porous membrane is coated on the entire surface thereof with the hydrophilic polymer. For practical purposes, it is sufficient for the coating of the hydrophilic polymer to be formed on one surface of the porous membrane and the inner surface of the pores of the membrane. The foregoing description has also been described on the assumption that the membrane is in the form of a flat sheet. Optionally, the membrane may be in the form of a hollow fiber.

Apart from the top which bears directly on this invention, since the vinyl alcohol-vinyl acetate copolymer has desirable affinity for polyvinyl fluoride, a hydrophilic membrane may be produced by having the vinyl alcohol-vinyl acetate copolymer incorporated in a certain proportion into polyvinylidene fluoride during the production of a polyvinylidene fluoride membrane. When this method is adopted, it is enabled to vary the strength of a porous membrane and obtain a hydrophilic membrane answering the purpose of its use by simultaneously incorporating therein an additional polymer such as polymethyl methacrylate which has satisfactory affinity for polyvinyl fluoride and is capable of enhancing the hardness of the resin.

Optionally, the vinyl alcohol-vinyl acetate copolymer which has been deposited on the surface of the hydrophobic membrane may be cross-linked by the use of dialdehyde or diisocyanate and further insolubilized in water.

The hydrophilic porous membrane of this invention finds utility in various applications because it excels in perviousness to water, efficiency of filtration, and mechanical strength. Typically, main uses found for the membrane are final filters for medicinal liquids and transfusion fluids, pharmaceutical filters, and membranes for artificial organs such as artificial kidney and blood plasma separation.

Now, a typical operation of the hydrophilic porous membrane of this invention used as a final filter for transfusion will be described below.

As illustrated in FIG. 2, a final filter 9 incorporating therein a hydrophilic porous membrane 1 of this invention and sterilized in advance is inserted halfway along the entire length of a transfusion tube 8 communicating with a transfusion bag 7. The transfusion fluid from the transfusion bag 7 is passed through the transfusion tube 8 and allowed to drop into the final filter 9. In the final filter 9, true fungi, bacteria, and microfine particles entrained by the transfusion fluid are stopped by the hydrophilic porous membrane 1 of the final filter 9. Only the cleaned transfusion fluid is passed through the final filter 9 and then allowed to flow through the transfusion tube 8 and find its way through an injection needle 11 into the vein of a patient 12. The complication due to the true fungi, bacteria, and microfine particles entrained by the transfusion fluid, therefore, is precluded.

Now, the present invention will be described more specifically below with reference to a working example.

EXAMPLE

A solution obtained by dissolving 18 parts by weight of polyvinyl fluoride powder (apparent melting viscosity ($j=10^2 sec^{-1}$) 27,000 poise (230° C.)) (produced by Mitsubishi Petro-Chemical Co., Ltd. and marketed under trademark designation of "Kynar K301") in 61.5 parts by weight of acetone and 20.5 parts by weight of dimethyl formamide was cast on a flat glass plate, immersed in a bath of isopropyl alcohol for 5 minutes, and dried to obtain a hydrophobic porous membrane 150 μm in thickness and 0.45 μm in average pore diameter.

Separately, 1 part by weight of vinyl alcohol-vinyl acetate copolymer (polymerization degree 300) (produced by Shin-etsu Chemical Industry Co., Ltd. and marketed under trademark designation of "SMR-30L") was dissolved in a mixed solvent comprising 49.5 parts by weight and 49.5 parts by weight of methanol.

The porous membrane of polyvinylidene fluoride was uniformly immersed in the resultant vinyl alcohol-vinyl acetate copolymer solution. About 10 seconds' immersion in the solution, the membrane was taken out of the solution and then dried thoroughly in an oven kept at 60° C.

When the porous membrane so obtained was immersed in water, the water immediately forced its way into the pores, indicating that the membrane had undergone impartation of thorough hydrophilicity. The hydrophilic porous membrane consequently obtained was tested for perviousness to water, bubble point, and porosity. The results are shown in Table 1. The numerical value of perviousness to water represents the amount of water in ml which had passed the membrane per minute per $cm^2$ of membrane area under a differential pressure of 52 cmHg (10 psi).

REFERENCE

A hydrophobic porous membrane of polyvinyl fluoride obtained by following the procedure of Example and not yet subjected to impartation of hydrophilicity was tested similarly for perviousness to water, bubble point, and porosity. The results are shown in Table 1. In the measurement of the perviousness to water, the membrane was subjected to initial displacement with methanol.

TABLE 1

|  | Perviousness to water (ml/min · cm²) | Bubble point (kg) | Porosity (%) |
|---|---|---|---|
| Example | 15.1 | 1.9 | 76.3 |
| Reference | 15.5 | 1.8 | 77.3 |

It is noted from the results given above that the hydrophilic porous membrane of this invention differs very little in shape from the hydrophobic membrane as a substrate and enjoys impartation of thorough hydrophilicity. In the experiment illustrated as Reference, since the methanol deposited on the membrane during the displacement vanishes when the impregnated membrane is dried, the membrane resumes hydrophobicity and fails to retain hydrophilicity after the drying.

CONTROL 1

A 4% solution of polyvinyl pyrrolidone (produced by BASF and marketed under trademark designation of "Kollidon 17PF") in methanol was prepared. A hydrophobic porous membrane produced by following the procedure of Example was immersed in the solution, pulled out of the solution, and dried. The hydrophilic membrane so obtained showed good wettability with water and no sign of degradation of perviousness to water in the first one cycle of service. When it was tried in the second cycle of service, however, the membrane was not wetted at all because the deposited polyvinyl pyrrolidone had been dissolved out during the previous cycle.

CONTROL 2

A hydrophobic porous membrane produced by following the procedure of Example was set inside a plasma generator and treated in air with a discharge output of 1 W/cm² at 0.5 Torr for 1 minute. The treatment was performed on both sides of the membrane. The treated membrane permitted absolutely no passage of water. The treatment, despite variations in discharge output, pressure, and duration, failed to produce a membrane pervious at all to water.

CONTROL 3

A hydrophobic porous membrane produced by following the procedure of Example was trially sulfonated with fuming sulfuric acid. This sulfonation was carried out by successive displacement with alcohol, water, 50% sulfuric acid, concentrated sulfuric acid, and fuming sulfuric acid. No sufficient impartation of hydrophilicity was obtained when the duration of treatment with fuming sulfuric acid was too short. The membrane was deteriorated when the duration was too long. The sulfonation failed to produce a hydrophilic porous membrane fit for actual use.

As described above, this invention pertains to a hydrophilic porous membrane which is characterized by having formed on at least one surface of a porous membrane of a hydrophobic polymer and on the inner surface of the pores of the membrane a coating obtained by dissolving a water-insoluble hydrophilic polymer in a solvent exhibiting satisfactory stability and a satisfactory wetting property with respect to the hydrophobic polymer mentioned above. Thus, the hydrophilic porous membrane safely retains the strength inherent in the porous membrane of the hydrophobic polymer and, at the same time, enjoys enhanced hydrophilicity and, therefore, is advantageously used as a membrane for ultrafiltration, as a membrane for reverse osmosis, etc. Particularly when the hydrophilic polymer is a vinyl alcohol-vinyl acetate copolymer, vinyl acetate-vinyl pyrrolidone copolymer, polymethyl methacrylate-polyethylene glycol block copolymer, or segmented polyurethane having polyethylene glycol as a soft segment and the hydrophobic polymer is polyvinylidene fluoride, the hydrophilic porous membrane produced by this invention enjoys high strength coupled with outstanding stability to resist heat and chemicals. This membrane finds extensive utility in applications in which the conventional hydrophilic membrane has failed to prove useful.

This invention further pertains to a method for the manufacture of a hydrophilic porous membrane, which is characterized by preparing a porous membrane of a hydrophobic polymer, impregnating the porous membrane with a solution obtained by dissolving a water-insoluble hydrophilic polymer in a solvent exhibiting a satisfactory ability to dissolve the hydrophilic polymer and also exhibiting satisfactory stability and a satisfactory wetting property with respect to the hydrophobic polymer, and thereafter drying the impregnated porous membrane. Thus, it permits a hydrophilic porous membrane possessing the outstanding properties mentioned above to be easily and quickly produced without requiring use of any special apparatus. Moreover, the porous membrane so produced can be marketed at a low price. When the manufacture of this hydrophilic porous membrane is carried out by using a vinyl alcohol-vinyl acetate copolymer, vinyl acetate-vinyl pyrrolidone copolymer, polymethyl methacrylate-polyethylene glycol block copolymer, or segmented polyurethane having polyethylene glycol as a soft segment as the hydrophilic polymer, polyvinylidene fluoride as the hydrophobic polymer, and methanol, ethanol, isopropanol, or a mixture of any one of these lower alcohols with water as the solvent, hydrophilicity can be imparted fast to the hydrophobic polymer without requiring the hydrophilic polymer to be grafted through the agency of ultraviolet light or heat as in the conventional method. Thus, the hydrophilic porous membrane enjoys long service life and high quality.

What is claimed is:

1. A hydrophilic porous membrane, comprising a porous membrane made of a hydrophobic polymer and a coating formed on at least one surface of said porous membrane and on the inner surface of porous of said porous membrane with a water-insoluble vinyl alcohol-vinyl acetate copolymer having a saponification degree of 15 to 60 mol % and soluble in a solvent exhibiting satisfactory stability and a satisfactory wetting property with respect to said hydrophobic polymer.

2. A hydrophilic porous membrane according to claim 1, wherein said hydrophobic polymer is a fluorine resin type polymer or a polyolefin type polymer.

3. A hydrophilic porous membrane according to claim 1, wherein said hydrophobic polymer is a fluorine resin type polymer.

4. A hydrophilic porous membrane according to claim 3, wherein said fluorine resin type polymer is polyvinylidene fluoride.

5. A hydrophilic porous membrane according to claim 1 wherein the saponification of said water insoluble vinyl alcohol-vinyl acetate copolymer is 25 to 45 mol %.

6. A hydrophilic porous membrane according to claim 5 wherein the porous membrane has a thickness of 100 to 200 μm and an average pore diameter of 0.1 to 0.6 μm.

7. A method according to claim 6, wherein said solvent is at least one member selected from the group consisting of methanol, ethanol, isopropanol, and mixtures of said alcohols with water.

8. A hydrophilic porous membrane according to claim 1 wherein the porous membrane has a thickness of 50 to 300 μm and an average pore diameter of 0.1 to 1.0 μm.

9. A method for the manufacture of a hydrophilic porous membrane, comprising the steps of:
   (a) preparing a porous membrane of a hydrophobic polymer,
   (b) impregnating said porous membrane with a solution obtained by dissolving a water-insoluble vinyl alcohol-vinyl acetate copolymer having 15 to 60 mol% of saponification degree in a solvent exhibiting a satisfactory ability to dissolve said copolymer, and exhibiting satisfactory stability and a satisfactory wetting property with respect to said hydrophobic polymer, wherein the concentration of said hydrophilic polymer in said solution is in the range of 0.1 to 10% by weight, and the duration of said impregnation of said porous membrane of a hydrophobic polymer with said solution of water-insoluble hydrophilic polymer is in the range of 1 to 30 seconds, and
   (c) drying the impregnated porous membrane to adhere said hydrophilic polymer with said hydrophobic polymer.

10. A method according to claim 9, wherein said hydrophobic polymer is a fluorine resin type polymer or a polyolefin type polymer.

11. A method according to claim 9, wherein said hydrophobic polymer is a fluorine resin type polymer.

12. A method according to claim 11, wherein said fluorine resin type polymer is polyvinylidene fluoride.

13. A method according to claim 9, wherein said impregnation of said porous membrane of a hydrophobic polymer with the solution of said water-insoluble hydrophilic polymer is effected by immersion of said porous membrane in said solution.

14. A method according to claim 9, wherein the saponification of said water insoluble vinyl alcohol-vinyl acetate copolymer is 25 to 45 mol %.

15. A method according to claim 9, wherein drying said hydrophilic porous membrane is carried out at a temperature of 60°–80° C.

* * * * *